US012651839B2

(12) United States Patent
Zhao et al.

(10) Patent No.: US 12,651,839 B2
(45) Date of Patent: Jun. 9, 2026

(54) LOW-PROFILE PATCH ANTENNA STACKED WITH SECOND ANTENNA/COIL AND USED FOR SATELLITE COMMUNICATION

(71) Applicant: MOTOROLA MOBILITY LLC, Wilmington, DE (US)

(72) Inventors: Junsheng Zhao, Vernon Hills, IL (US); Xuyuan Pan, Chicago, IL (US); Md Faisal Abedin, Lake Bluff, IL (US); Mohammed Abdul-Gaffoor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 353 days.

(21) Appl. No.: 18/479,082

(22) Filed: Oct. 1, 2023

(65) Prior Publication Data

US 2025/0112368 A1 Apr. 3, 2025

(51) Int. Cl.
*H01Q 7/00* (2006.01)
*H01Q 9/04* (2006.01)

(52) U.S. Cl.
CPC ............. *H01Q 9/0414* (2013.01); *H01Q 7/00* (2013.01)

(58) Field of Classification Search
CPC ............................... H01Q 9/0414; H01Q 7/00
See application file for complete search history.

(56) References Cited

U.S. PATENT DOCUMENTS

| | | | | |
|---|---|---|---|---|
| 9,825,674 | B1 * | 11/2017 | Leabman | H04B 5/79 |
| 11,545,747 | B2 | 1/2023 | Billy et al. | |
| 11,616,300 | B1 | 3/2023 | Bastin | |
| 2005/0206568 | A1 | 9/2005 | Phillips et al. | |
| 2013/0267170 | A1 * | 10/2013 | Chong | H01Q 1/243 455/41.1 |
| 2023/0052927 | A1 | 2/2023 | Kim et al. | |

OTHER PUBLICATIONS

Wideband Dual-Circularly Polarized Antennas Using Aperture-Coupled Stacked Patches and Single-Section Hybrid Coupler, Son Xuat Ta et al. Feb. 28, 2022, IEEE Access.

* cited by examiner

*Primary Examiner* — Henry Luong
(74) *Attorney, Agent, or Firm* — Isidore PLLC

(57) ABSTRACT

An antenna assembly includes a patch antenna configured to communicate with a communication satellite and a second antenna or coil configured for radio frequency (RF) transceiving attached on top of the patch antenna in a stacked configuration. The patch antenna includes (i) a ground plane; (ii) a substrate comprising a low dielectric constant and low loss material and positioned on the ground plane; and (iii) a conductive radiator patch positioned on the substrate. A second outer edge of the second antenna or coil is spaced inwardly from a corresponding outer edge of the patch antenna to minimize interference between respective fringe fields. The antenna stack is attached to a device housing of a communication device and communicatively coupled to a communications subsystem to enable satellite communication.

19 Claims, 11 Drawing Sheets

LOW-PROFILE PATCH ANTENNA STACKED WITH SECOND ANTENNA/COIL AND USED FOR SATELLITE COMMUNICATION

BACKGROUND

1. Technical Field

The present disclosure relates generally to radio frequency (RF) antennas configured for satellite communication, and more particularly to RF patch antennas that support satellite communication.

2. Description of the Related Art

Portable communication devices, particularly smartphones, have become ubiquitous. Antennas are incorporated into the portable communication devices to support communications in one or more radio frequency (RF) bands using one or more communication protocols. Locations on the portable communication devices for antennas are limited by the overall small size of the portable communication devices and by one or more displays that can cover a front side and portions of a back side of the device. Some RF bands may be supportable by antennas positioned along thin lateral edges of the communication device. However, some antennas need to be on the front side or the back side of the device due to the size of the antenna. In an example, antennas that support near field communication (NFC), wireless charger (WLC), and ultra-wide band (UWB) have a large footprint. Patch antennas for satellite communication also have a large footprint. With no available locations remaining on a conventional portable communication device, incorporating an antenna for satellite communication results in having to replace one or more other antennas that have a large footprint (e.g., NFC, WLC, and UWB antennas). Conventional antennas for satellite communication utilize a thick ceramic substrate that is not feasible or desirable for incorporating into a portable communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
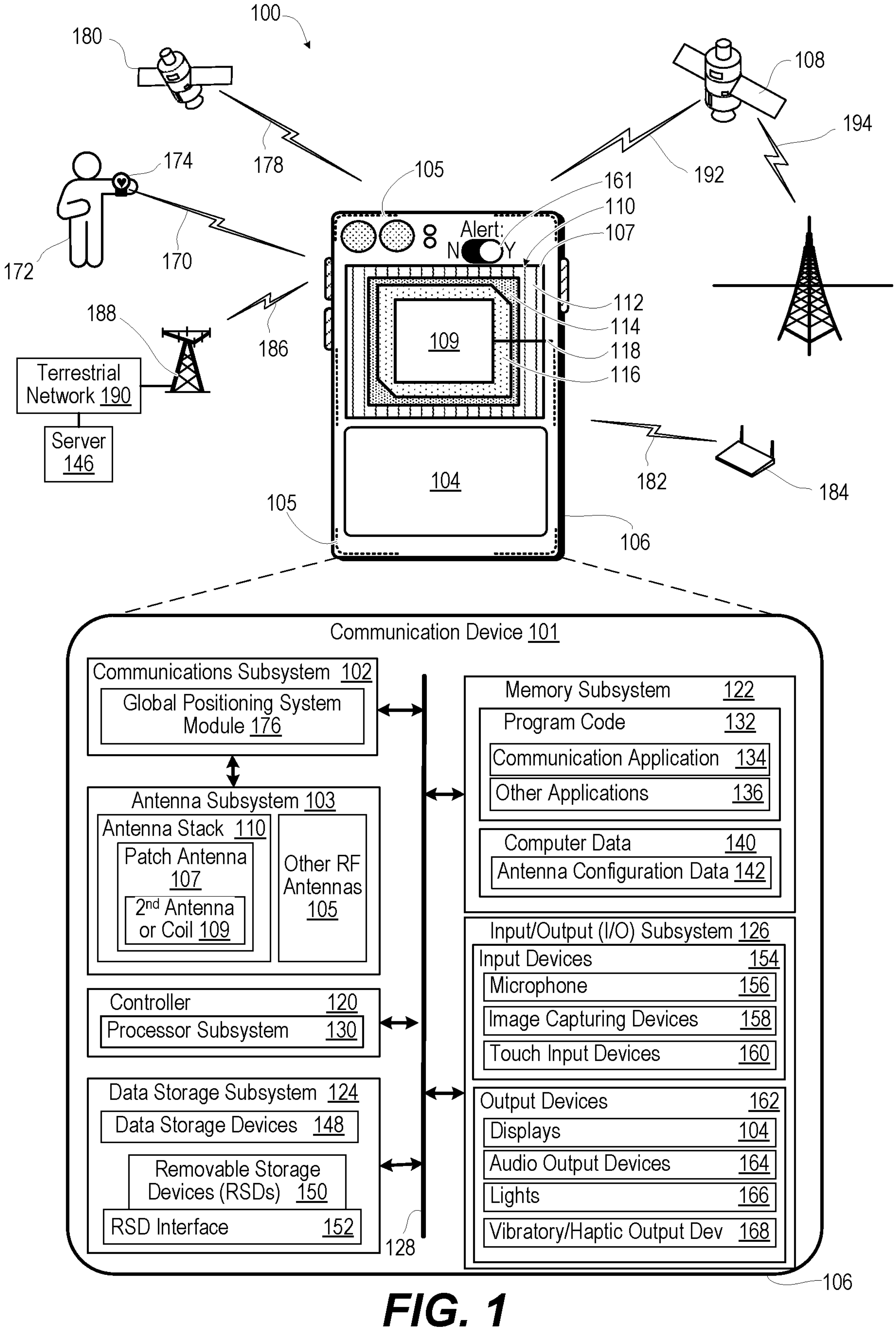
FIG. 1 presents a simplified functional block diagram of a communication device having an antenna assembly of a low-profile satellite patch antenna stacked with a second antenna or coil to form an antenna stack, according to one or more embodiments.

According to a first aspect of the present disclosure, an antenna assembly includes a patch antenna configured to communicate with a communication satellite and having a first footprint size. The antenna assembly includes a second antenna or coil configured for radio frequency (RF) transceiving, having a second footprint size that is smaller than the first footprint size. The second antenna or coil is positioned on the patch antenna with a second outer edge of the second antenna or coil within an outer edge of the patch antenna. In one or more particular embodiments, the patch antenna includes: (i) a ground plane (e.g., thin sheet of conductive metal such as copper); (ii) a substrate of a low dielectric constant and low loss material (e.g., a plastic material in a range of 0.5 to 1 mm thickness) and positioned on the ground plane; and (iii) a conductive radiator patch positioned on the substrate. The second outer edge of the second antenna or coil is spaced inwardly at least 1 mm from the corresponding outer edge of the patch antenna to avoid interference between fringe fields.

According to a second aspect of the present disclosure, the antenna assembly is particularly suitable for being incorporated in a communication device. A communications subsystem of the communication device is communicatively coupled to the patch antenna. The communications subsystem is configured to at least one of transmit an uplink and receive a downlink from a communications satellite.

According to a third aspect of the present disclosure, a method of making the antenna assembly includes assembling a patch antenna configured to communicate with a communication satellite and having a first footprint size. The patch antenna includes: (i) a ground plane; (ii) a substrate comprising a low dielectric constant and low loss material and positioned on the ground plane; and (iii) a conductive radiator patch positioned on the substrate. The method includes attaching a second antenna or coil to the patch antenna. The second antenna or coil is configured for RF transceiving, having a second footprint size that is smaller than the first footprint size, and positioned on the patch antenna with a second outer edge of the second antenna or coil within an outer edge of the patch antenna.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

The present disclosure addresses particular challenges for enabling satellite communications by a portable hand-held device. Unlike with global positioning system (GPS) communication, which requires only a GPS receiver to receive GPS satellite signals, satellite communications include transmitting as well as receiving signals. Because the satellite signal is right hand circular polarized (RHCP), a typical linear polarized antenna for wireless communications is not preferred for satellite communications. The present disclosure provides for an RHCP patch antenna in addition to the linear polarized antenna for wireless communications within the same form factor of the communication device. A RHCP patch antenna inherently has a 3 dB higher antenna gain as compared to a linear antenna for transceiving an RHCP signal (i.e., the linear antenna loses half of the antenna performance of the RHCP patch antenna). The RHCP patch antenna has a wide main beam which reduces the reliance of aligning the antenna pattern with the position/location of the satellites, which may result in an enhanced user experience by acquiring a radio link quicker. In addition, among RHCP antennas, a patch antenna solution is more desired due to several inherent advantages including higher performance, low profile, low cost, and simplified fabrication, etc. Particular embodiments of the RHCP patch antenna according to the present disclosure have a particularly low profile of 0.5-1.0 mm thickness by using a low dielectric constant plastic substrate with low loss. By contrast, conventional satellite antennas have a 4 mm thick ceramic substrate along with a relatively large ground plane, which may be unsuitable or at least undesirable for use in a portable device.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of a communication device 101 that may operate as a mobile user device in communication environment 100, in which the features of the present disclosure are advantageously implemented. Communication device 101 includes communications subsystem 102 that performs radio frequency (RF) communication via antenna subsystem 103. Front and back faces of communication device 101 may include one or more displays 104 that limit available locations for antennas subsystem 103. In an example, RF antennas 105 of antenna subsystem 103 have a small footprint enabling incorporation on, or proximate to, thin edges along right, left, top, and bottom edges of device housing 106. Communications subsystem 102 is communicatively connectable, via patch antenna 107 of antenna subsystem 103, to satellites 108 for communication services. Patch antenna 107 has a large footprint, being larger than RF antennas 105, requiring a planar space on the front or back face of device housing 106. In addition to satellite communication capabilities, communication device 101 may include other wireless and cellular RF communication capabilities supported by one or more second antenna or coil 109 that also have a large footprint. According to aspects of the present disclosure, second antenna or coil 109 may be stacked with patch antenna 107 to form antenna stack 110 of antenna subsystem 103 to better utilize available antenna locations on device housing 106. Examples of second antenna or coil 109 that are planar with a large footprint include a near field communication (NFC) antenna, an ultra-wideband (UWB) antenna, and a wireless charger (WLC) coil. A WLC coil inductively couples to an electromagnetic field generated by a wireless charger over a short distance rather than producing or receiving an RF broadcast signal. A WLC coil is physically similar to other large footprint antennas described herein and is considered to be an antenna for purposes of the present disclosure.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Figure 2:
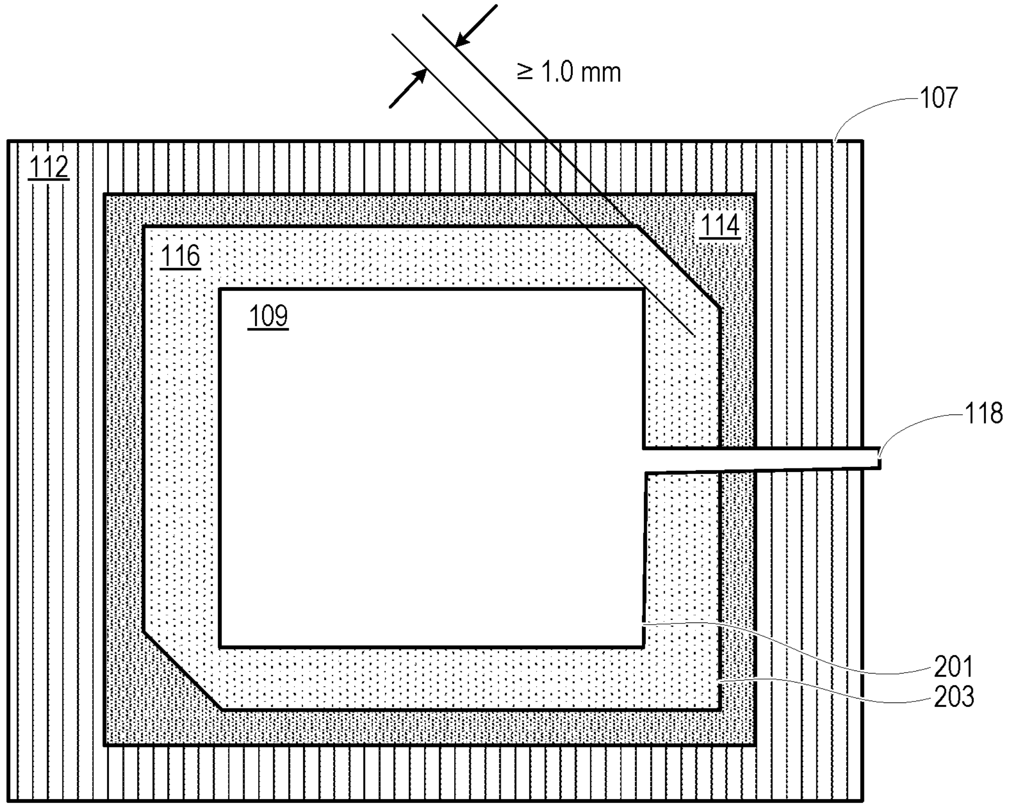
FIG. 2 is a front view of the antenna stack, according to one or more embodiments.
Figure 3:
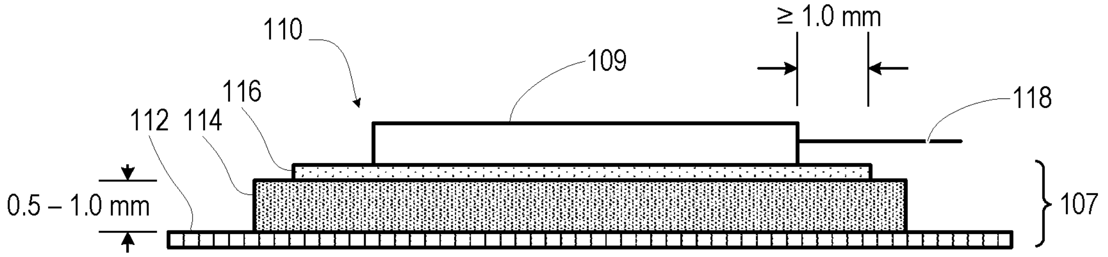
FIG. 3 is a side view of the antenna stack, according to one or more embodiments.

FIG. 2 is a front view of antenna stack 110. FIG. 3 is a side view of antenna stack 110. With reference to FIGS. 1, 2, and 3, in one or more embodiments, patch antenna 107 is a right hand circularly polarized antenna that includes: (i) ground plane 112; (ii) substrate 114 of a low dielectric constant and low loss material (e.g., a plastic material in a range of 0.5 to 1 mm thickness) and positioned on ground plane 112; and (iii) conductive radiator patch 116 positioned on substrate 114. Conductive radiator patch 116 of patch antenna 107 has a first footprint size. Second antenna or coil 109 is configured for RF transmitting, receiving, or transceiving, and has a second footprint size that is smaller than the first footprint size of patch antenna 107. Second antenna or coil 109 is positioned on conductive radiator patch 116 of patch antenna 107 with second outer edge 201 (FIG. 2) of second antenna or coil 109 located within outer edge 203 (FIG. 2) of patch antenna 107. Second outer edge 201 (FIG. 2) of second antenna or coil 109 is spaced inwardly at least 1 mm from corresponding outer edge 203 (FIG. 2) of patch antenna 107, with exception of flex tail 118 of second antenna or coil 109. According to a second aspect of the present disclosure, antenna stack 110 is particularly suitable for being incorporated in communication device 101 by being low profile and by requiring about half of the space of incorporating both patch antenna 107 and second antenna or coil 109 without stacking.

Figure 4:
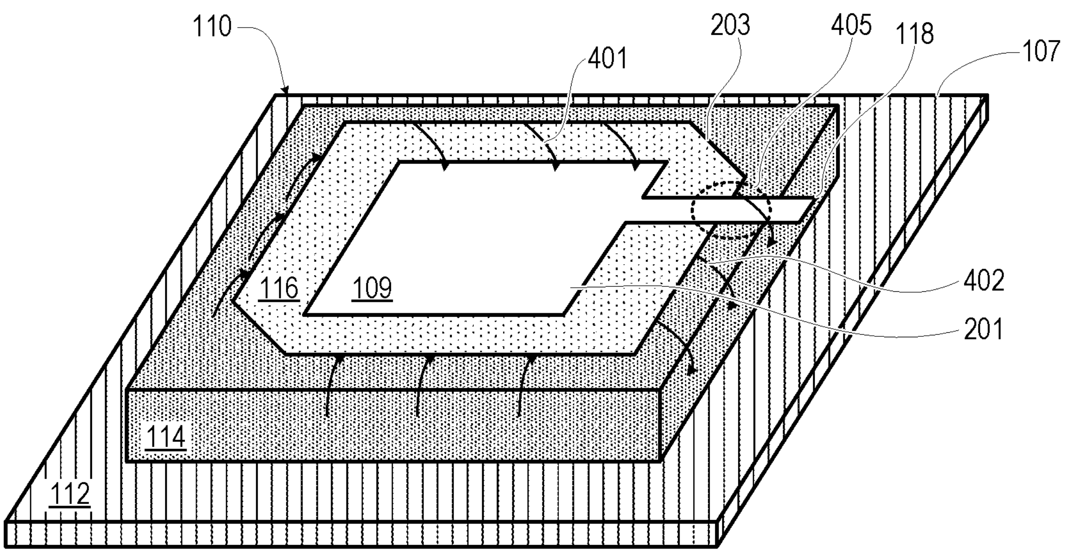
FIG. 4 is a three-dimensional view of the antenna stack annotated with electromagnetic flux lines of a fringe field, according to one or more embodiments.
Figure 5:
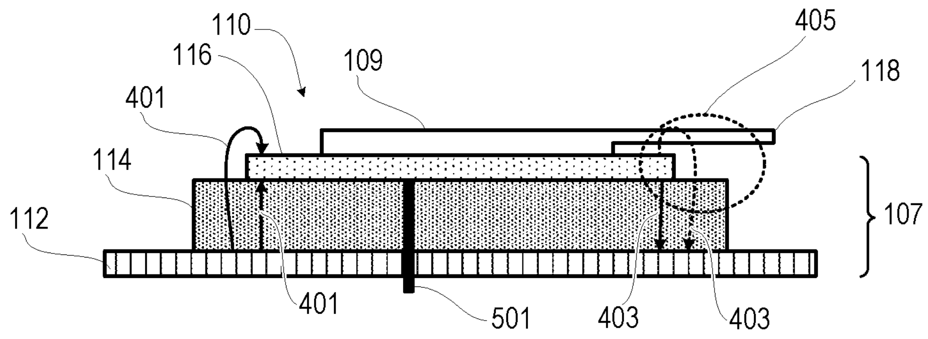
FIG. 5 is a side view of the antenna stack annotated with electromagnetic flux lines including a probe line that transfers signals to the conductive radiator patch, according to one or more embodiments.
Figure 8:
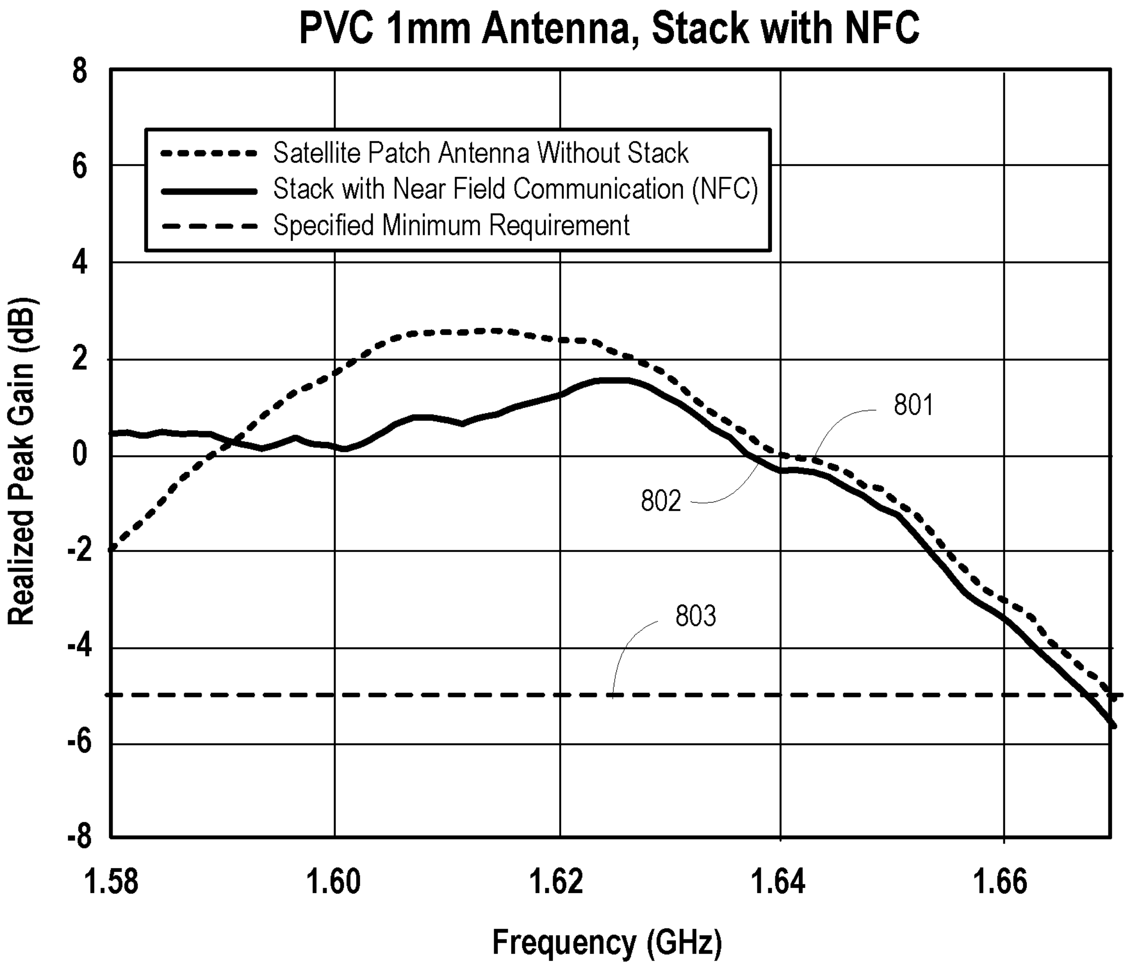
FIG. 8 presents graphical plots of realized peak gain in decibels (dB) as a function of frequency comparing an unstacked patch antenna to the antenna stack of FIG. 6 that includes the NFC coil, according to one or more embodiments.
Figure 11:
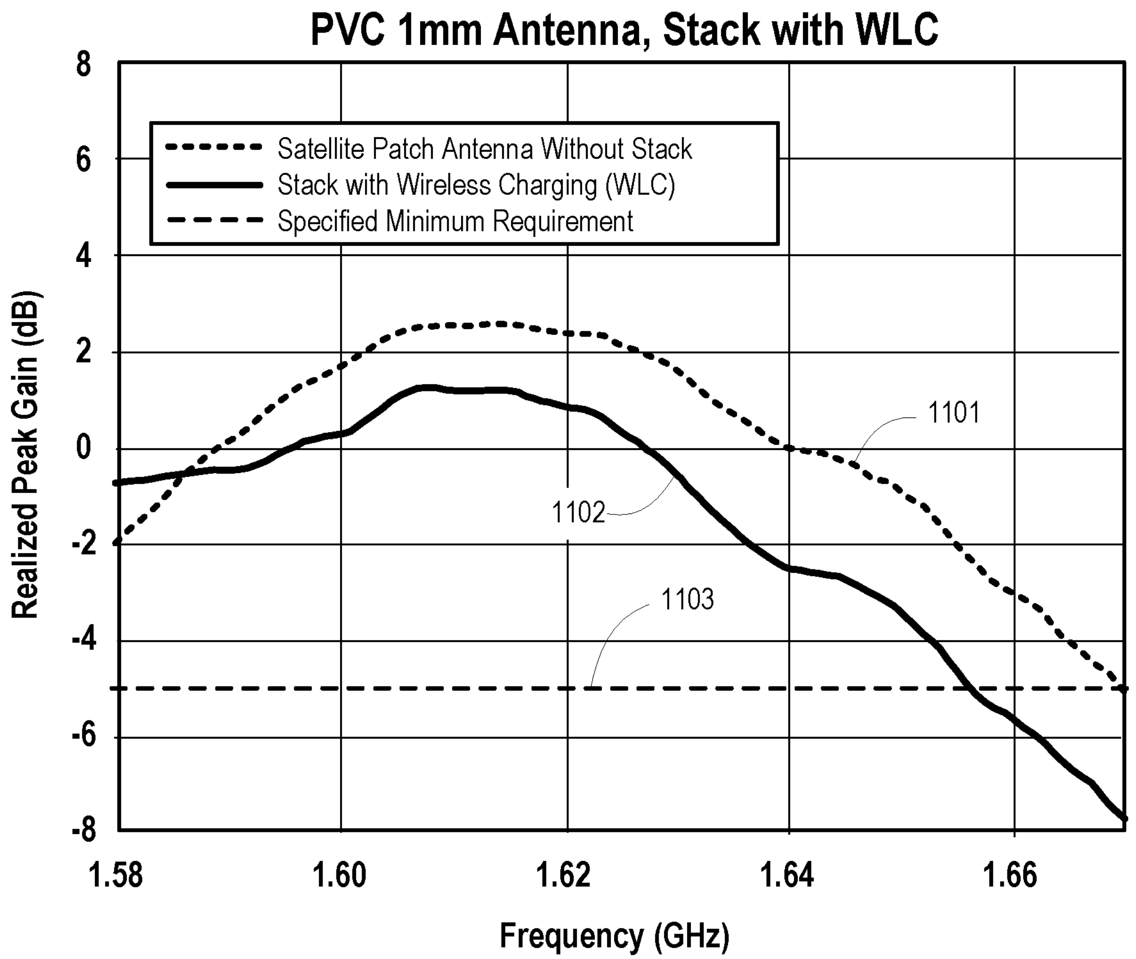
FIG. 11 presents graphical plots of realized peak gain in dB as a function of frequency comparing an unstacked patch antenna to the antenna stack of FIG. 9 that includes the WLC coil, according to one or more embodiments.
Figure 14:
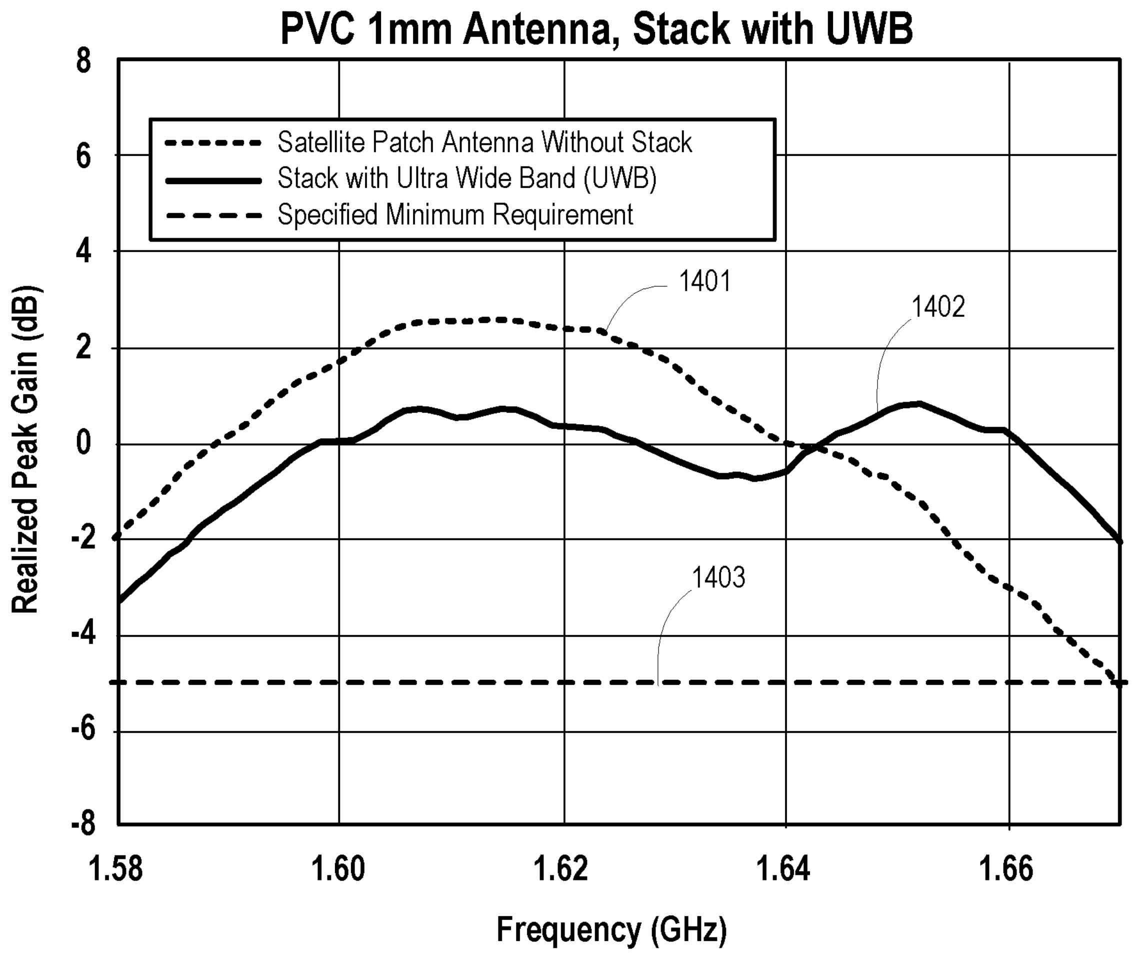
FIG. 14 presents graphical plots of realized peak gain in dB as a function of frequency comparing an unstacked patch antenna to the antenna stack of FIG. 12 that includes the UWB coil, according to one or more embodiments.

FIG. 4 is a three-dimensional view of antenna stack 110 annotated with electromagnetic flux lines 401 from ground plane 112 to conductive radiator patch 116 and flux lines 402 from conductive radiator patch 116 to ground plane 112. Flux lines 401-402 are fringe fields at outer edge 203 of conductive radiator patch 116. Second antenna or coil 109 has a similar fringe field around second outer edge 201 that is set back from outer edge 203, enabling coexistence within antenna stack 110. Only flex tail 118 with signal lines of second antenna or coil 109 passes through flux lines 401-402 of patch antenna 107. Relatively small area 405 of potential interference does not significantly degrade antenna performance, as depicted in FIGS. 8, 11, and 14 and described below. FIG. 5 is a side view of antenna stack 110 annotated with electromagnetic flux lines 401-402 and including probe line 501 that is a vertical feed that transfers signals to conductive radiator patch 116. In one or more embodiments, instead of probe line 501, patch antenna 107 may receive signals through a side feed transmission line on the same plane of conductive radiator patch 116 as depicted for second antenna or coil 109 and flex tail 118.

With continued reference to FIG. 1, in addition to communications subsystem 102, communication device 101 may include controller 120, memory subsystem 122, data storage subsystem 124 and input/output (I/O) subsystem 126. To enable management by controller 120, system interlink 128 communicatively connects controller 120 with communications subsystem 102, memory subsystem 122, data storage subsystem 124 and input/output (I/O) subsystem 126. System interlink 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1, it is to be understood that more, fewer, or different interconnections may be present in other embodiments.

Controller 120 includes processor subsystem 130, which includes one or more central processing units (CPUs) or data processors. Processor subsystem 130 can include one or more digital signal processors that can be integrated with data processor(s). Processor subsystem 130 can include other processors such as auxiliary processor(s) that may act as a low power consumption, always-on sensor hub for physical sensors. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 122 stores program code 132 for execution by processor subsystem 130 to provide the functionality described herein. Program code 132 includes applications such as communication application 134 that is configurable for communicating with satellite 108. Program code 132 may include other applications 136. These applications may be software or firmware that, when executed by controller 120, configures communication device 101 to provide functionality described herein. In one or more embodiments, several of the described aspects of the present disclosure are provided via executable program code of applications executed by controller 120. In one or more embodiments, program code 132 may be integrated into a distinct chipset or hardware module as firmware that operates separately from executable program code. Portions of program code 132 may be incorporated into different hardware components that operate in a distributed or collaborative manner. Implementation of program code 132 may use any known mechanism or process for doing so using integrated hardware and/or software, as known by those skilled in the art. Memory subsystem 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as antenna configuration data 142. Computer data 140 may incorporate "data" that originated as raw, real-world "analog" information that consists of basic facts and figures. Computer data 140 includes different forms of data, such as numerical data, images, coding, notes, and financial data. Computer data 140 may originate at communication device 101 or be retrieved by communication device 101 from a second device, such as network server 146, to which communication device 101 can communicatively connect. Communication device 101 may store, modify, present, or transmit computer data 140. Computer data 140 may be organized in one of a number of different data structures. Common examples of computer data 140 include video, graphics, text, and images. Computer data 140 can also be in other forms of flat files, databases, and other data structures.

Data storage subsystem 122 of communication device 101 includes data storage device(s) 148. Controller 120 is communicatively connected, via system interlink 128, to data storage device(s) 148. Data storage subsystem 124 provides program code 132 and computer data 140 stored on non-volatile storage that is accessible by controller 120. For example, data storage subsystem 124 can provide a selection of program code 132 and computer data 140. These applications can be loaded into memory subsystem 122 for execution/processing by controller 120. In one or more embodiments, data storage device(s) 148 can include hard disk drives (HDDs), optical disk drives, and/or solid-state drives (SSDs), etc. Data storage subsystem 124 of communication device 101 can include removable storage device(s) (RSD(s)) 150, which is received in RSD interface 152. Controller 120 is communicatively connected to RSD 150, via system interlink 128 and RSD interface 152. In one or more embodiments, RSD 150 is a non-transitory computer program product or computer readable storage device, which stores program code/instructions that may be executed by a processor associated with a communication device such as communication device 101. Controller 120 can access data storage device(s) 148 or RSD 150 to provision communication device 101 with program code 132 and computer data 140.

I/O subsystem 126 may include input devices 154 such as microphone 156, image capturing devices 158, and touch input devices 160 (e.g., screens, keys or buttons). In one or more embodiments, input devices 154 includes a dedicated emergency alert control 161 that receives manual activation to trigger sending an emergency alert to satellite 108. Input devices 154 may receive a user input that indicates a trigger to initiate satellite communications. I/O subsystem 126 may include output devices 162 such as display 104, audio output devices 164, lights 166, and vibratory or haptic output devices 168. One or more of the output devices may present a status indication of an alert transmitted by communication device 101 to satellite 108. In an example, display 104 may present an alert status indication.

In one or more embodiments, controller 120, via communications subsystem 102, performs multiple types of cellular over-the-air (OTA) or wireless communication, such as by using a Bluetooth connection or other personal access network (PAN) connection 170. In an example, user 172 may wear a health monitoring device depicted as smartwatch 174 that is communicatively coupled via connection 170. Smartwatch 174 may send a message to communication device that is a trigger for communicating with satellite 108. In an example, smartwatch 174 may detect a health abnormality of user 172, warranting immediate attention by healthcare first responder. In one or more embodiments, communications subsystem 102 includes global positioning system (GPS) module 176 that receives GPS broadcasts 178 from GPS satellites 180 to obtain geospatial location information. In one or more embodiments, controller 120, via communications subsystem 102, communicates via a wireless local area network (WLAN) link 182 using one or more IEEE 802.11 WLAN protocols with access point 184. In one or more embodiments, controller 120, via communications subsystem 102, may communicate via an OTA cellular connection 186 with radio access networks (RANs) 188. In an example, communication device 101, via communications subsystem 102, connects via RANs 188 of terrestrial network 190 that is communicatively connected to network server 146. According to aspects of the present disclosure, controller 120, via communications subsystem 102 and patch antenna 107, communicates via satellite link 192 with satellite 108 that is part of a non-terrestrial network 194.

Figure 6:
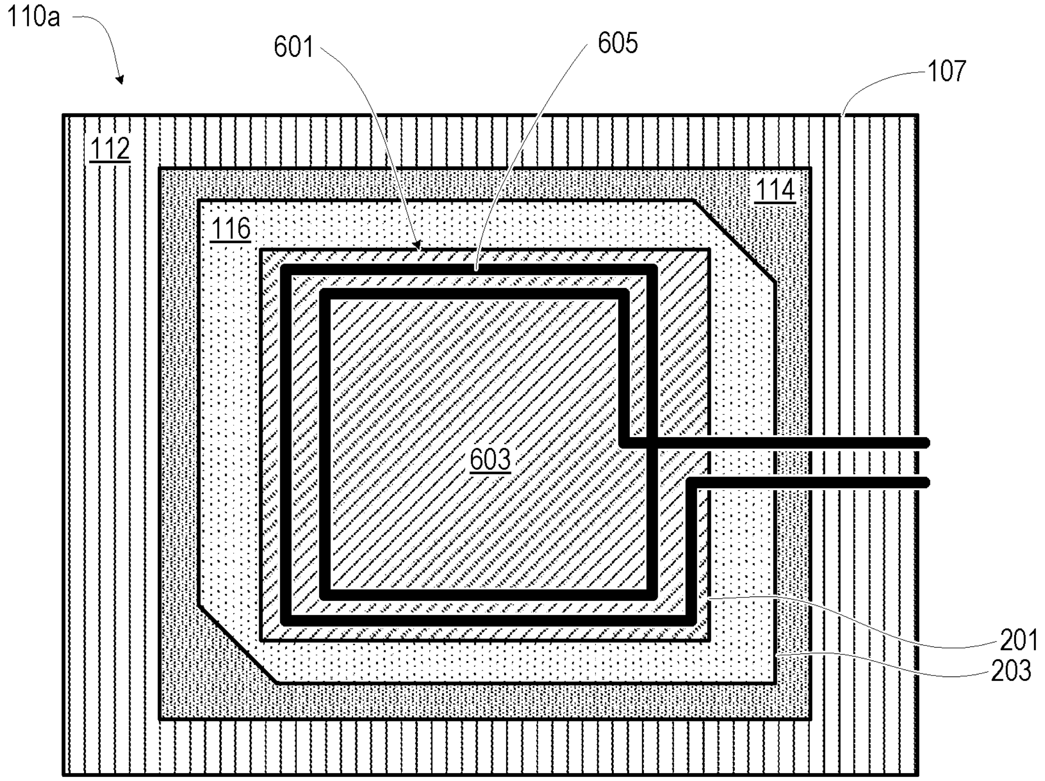
FIG. 6 is a front view of an example antenna stack including a ferrite layer that supports a near field communication (NFC) coil of a NFC coil assembly positioned on the patch antenna, according to one or more embodiments.
Figure 7:
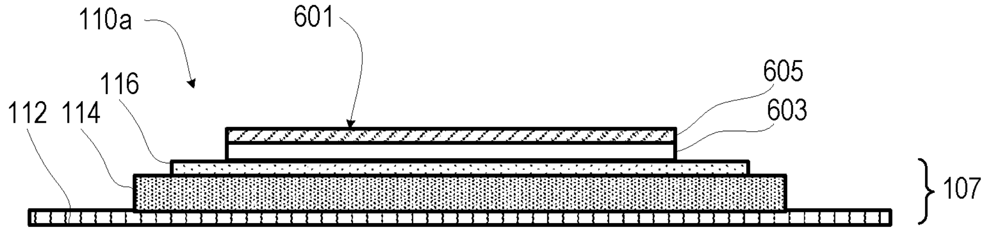
FIG. 7 is a side view of the example antenna stack of FIG. 6, according to one or more embodiments.

FIG. 6 is a front view of another example antenna stack 110*a* with NFC coil assembly 601 as the second antenna or coil. FIG. 7 is a side view of antenna stack 110*a* of FIG. 6. Patch antenna 107 includes ground plane 112, substrate 114, and conductive radiator patch 116. NFC coil assembly 601 includes ferrite layer 603 that supports NFC coil 605. Ferrite layer 603 of NFC coil assembly 601 is positioned on conductive radiator patch 116 of patch antenna 107 to form antenna stack 110*a*. FIG. 8 presents graphical plots 801-802 of realized peak gain in dB as a function of frequency respectively comparing an unstacked patch antenna to antenna stack 110*a* of FIG. 6 with NFC coil assembly 601 as the second antenna or coil. In electromagnetics, an antenna's gain is a key performance parameter which combines the antenna's directivity and radiation efficiency. In a transmitting antenna, the gain describes how well the antenna converts input power into radio waves headed in a specified direction. In a receiving antenna, the gain describes how well the antenna converts radio waves arriving from a specified direction into electrical power. When no direction is specified, gain is understood to refer to the peak value of the gain, the gain in the direction of the antenna's main lobe. Gain or 'absolute gain' is defined as the ratio of the radiation intensity in a given direction to the radiation intensity that would be produced if the power accepted by the antenna were isotropically radiated. Due to reciprocity, the gain of any antenna when receiving is equal to its gain when transmitting. Realized gain differs from gain in that it is reduced by its impedance mismatch factor. This mismatch induces losses above the dissipative losses; therefore, realized gain will always be less than gain. A higher realized gain is better (i.e., more efficient) than a lower realized gain. Horizontal plot 803 is an industry standard for realized peak gain. Satisfactory realized peak gain is above horizontal plot 803. Thus, the comparison of graphical plots 801-802 is to identify any frequency ranges where plot 802 is lower than plot 801, indicating a reduction in realized antenna gain of the patch antenna due to interference with the second antenna or coil (i.e., NFC antenna). By nesting the fringe field of NFC coil assembly 601 inside of the fringe field of patch antenna 107, performance of the antenna stack 110*a* of FIG. 6 is better than an industry standard and compares favorably to unstacked patch antenna.

Figure 9:
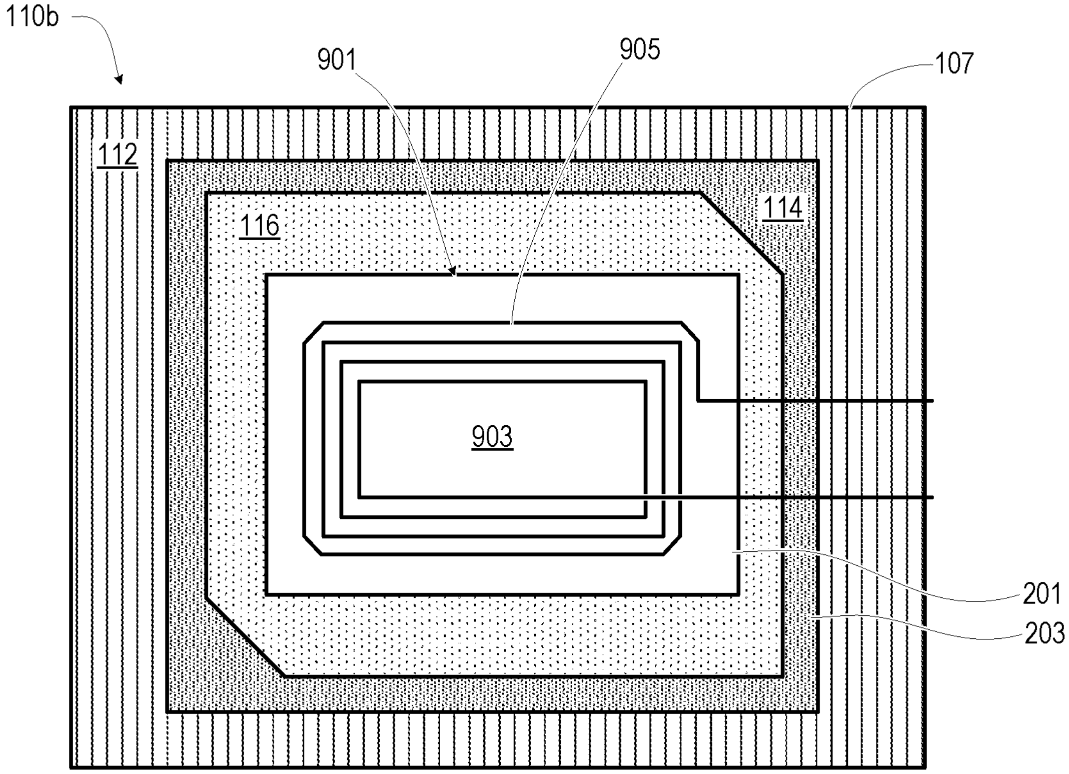
FIG. 9 is a front view of an example antenna stack including a ferrite layer that supports wireless charger (WLC) coil of a WLC coil assembly positioned on the patch antenna, according to one or more embodiments.
Figure 10:
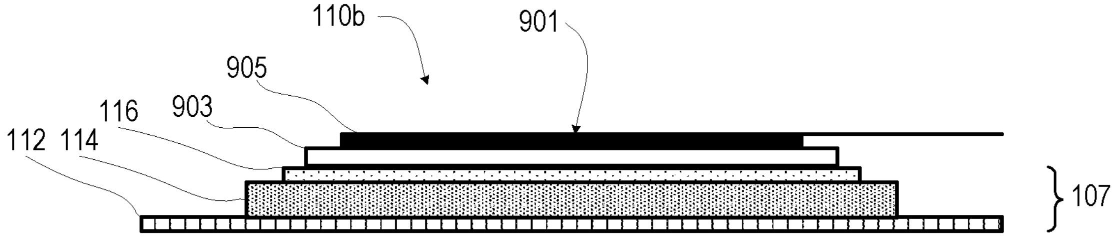
FIG. 10 is a side view of the example antenna stack of FIG. 9, according to one or more embodiments.

FIG. 9 is a front view of example antenna stack 110*b* with WLC coil assembly 901 as the second antenna or coil positioned on patch antenna 107. FIG. 10 is a side view of antenna stack 110*b*. Patch antenna 107 includes ground plane 112, substrate 114, and conductive radiator patch 116. WLC coil assembly 901 includes ferrite layer 903 that supports WLC coil 905. FIG. 11 presents graphical plots 1101-1102 of realized peak gain in dB as a function of frequency comparing an unstacked patch antenna to the antenna stack 110*b* of FIG. 9 with the WLC coil assembly 901. Plot 1102 is generally 2 dB below plot 1101, indicating a reduction of realized antenna gain of the patch antenna introduced by interference with the second antenna or coil. Horizontal plot 1103 is an industry standard for realized peak gain. Satisfactory realized peak gain is above horizontal plot 1103. By nesting the fringe field of WLC coil assembly 901 inside of the fringe field of patch antenna 107, performance of the antenna stack 110*b* of FIG. 9 is generally better than an industry standard even with the 2 dB loss of realized antenna gain.

Figure 12:
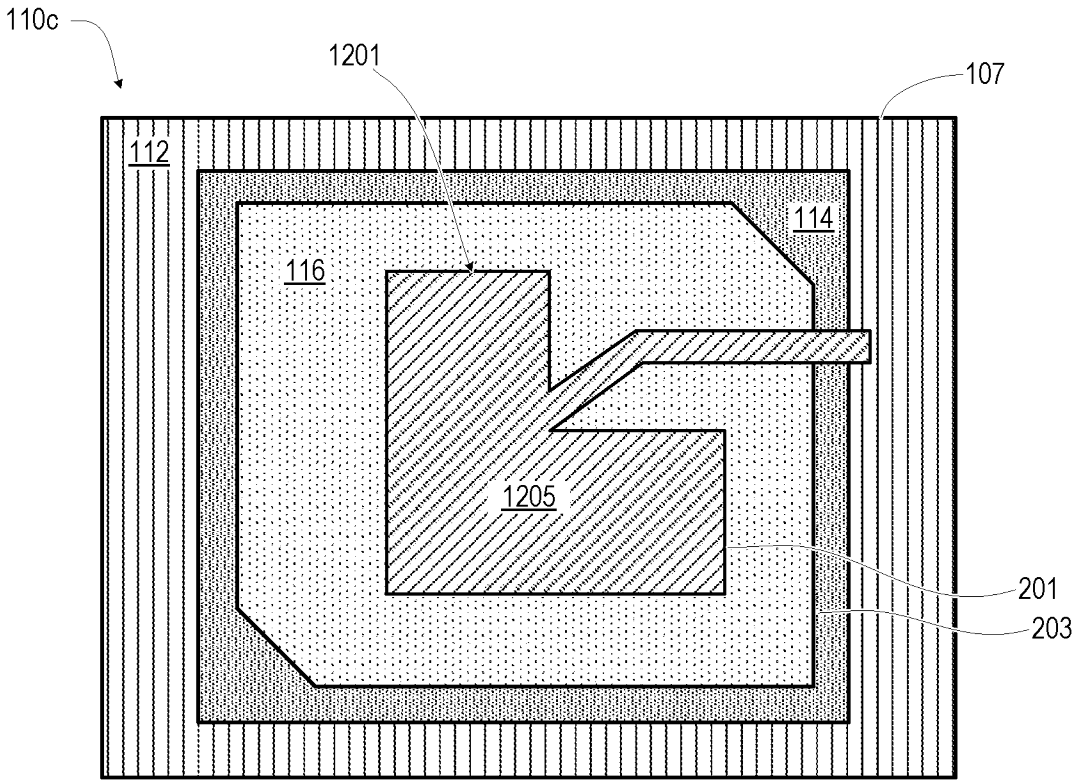
FIG. 12 is a front view of an example antenna stack including an ultra-wide band (UWB) ground layer that supports a UWB substrate and patches of a UWB antenna positioned on the patch antenna, according to one or more embodiments.
Figure 13:
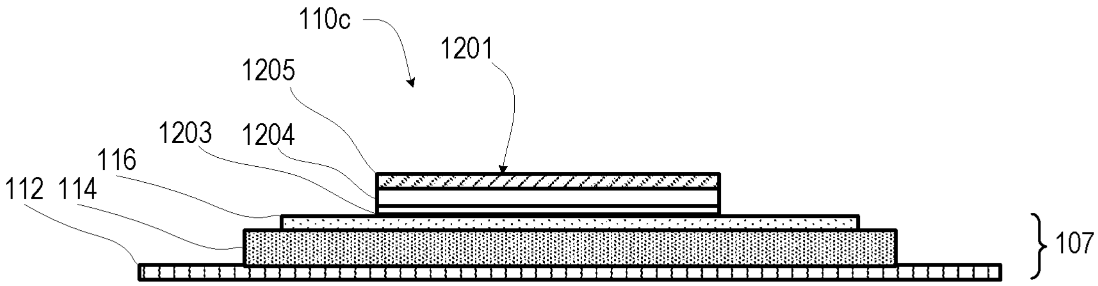
FIG. 13 is a side view of the example antenna stack of FIG. 12, according to one or more embodiments.

FIG. 12 is a front view of example antenna stack 110*c* with UWB antenna assembly 1201 as the second antenna or coil positioned on patch antenna 107. FIG. 13 is a side view of antenna stack 110*c* of FIG. 12. Patch antenna 107 includes ground plane 112, substrate 114, and conductive radiator patch 116. UWB antenna assembly 1201 includes UWB ground layer 1203 that supports UWB substrate 1204, which in turn supports UWB antenna 1205. UWB ground layer 1203 of UWB antenna assembly is positioned on conductive radiator patch 116 of patch antenna 107 to form antenna stack 110*c*. FIG. 14 presents graphical plots 1401-1402 of realized peak gain in dB as a function of frequency comparing an unstacked patch antenna to antenna stack 110*c* of FIG. 12, which includes UWB coil assembly 1201. Horizontal plot 1403 is an industry standard for realized peak gain. Satisfactory realized peak gain is above horizontal plot 1403. Plot 1402 is 1-2 dB below plot 1101 while below 1.65 GHz and has a better gain above 1.65 GHz. Throughout the plotted frequencies, patch antenna of the stack antenna has realized antenna gain that is above the specified industry standard. By nesting the fringe field of UWB antenna assembly 1201 inside of the fringe field of patch antenna 107, performance of the antenna stack 110*c* of FIG. 12 is better than an industry standard and compares favorably to unstacked patch antenna.

Figure 15:
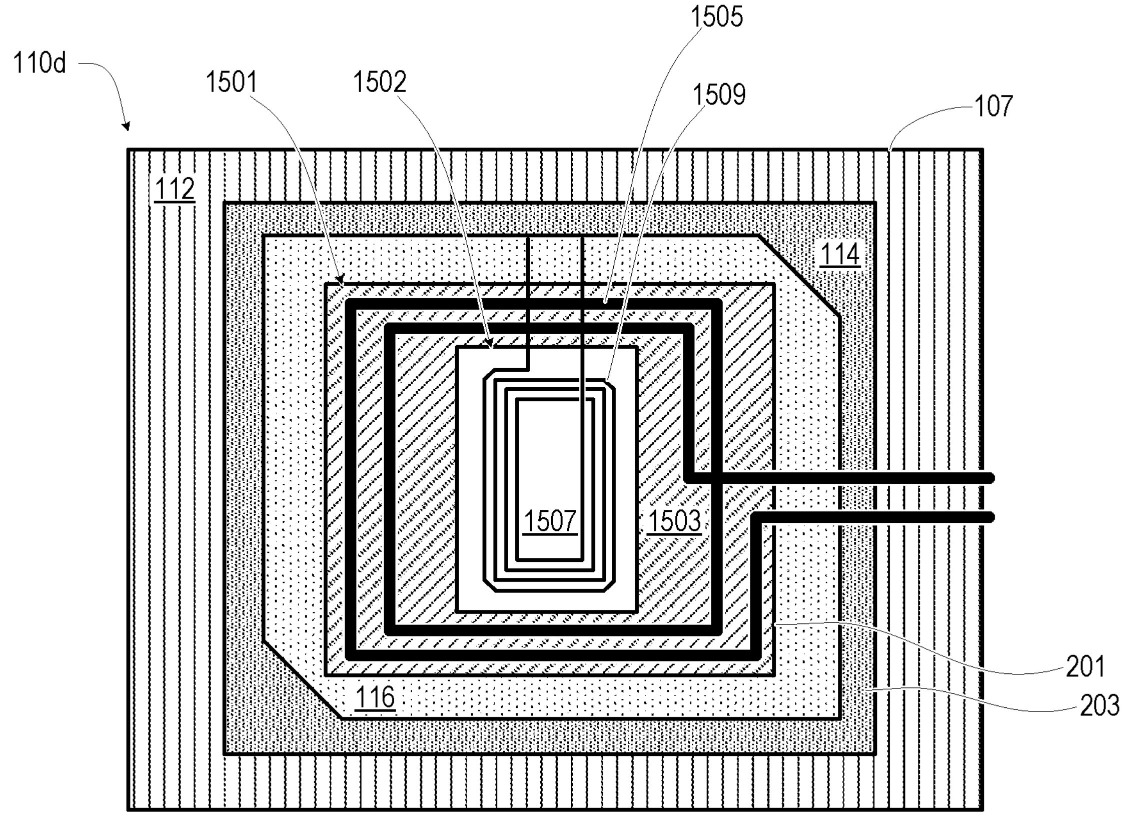
FIG. 15 is a front view of an example antenna stack including an NFC/WLC ferrite supporting an NFC coil surrounding a WLC coil and positioned on the patch antenna, according to one or more embodiments.
Figure 16:
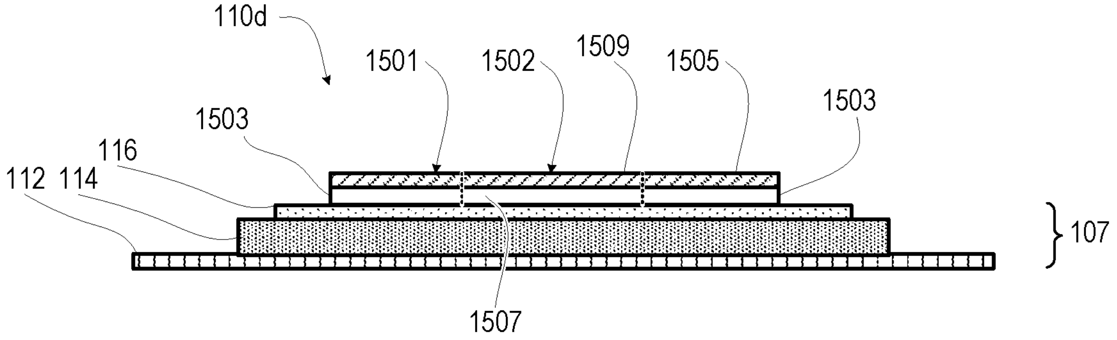
FIG. 16 is a side view of the example antenna stack of FIG. 15, according to one or more embodiments.

FIG. 15 is a front view of antenna stack 110*d* including second antenna or coil provided by NFC coil assembly 1501 that surrounds third antennas provided by WLC coil assembly 1502. FIG. 16 is a side view of the example antenna stack 110*d* of FIG. 15. Patch antenna 107 includes ground plane 112, substrate 114, and conductive radiator patch 116. NFC coil assembly 1501 includes NFC ferrite ring 1503 that supports NFC coil 1505. WLC coil assembly 1502 includes WLC ferrite layer 1507 that supports WLC coil 1509. NFC ferrite ring 1503 of NFC coil assembly 1501 and WLC ferrite layer 1507 of WLC coil assembly 1502 are positioned on conductive radiator patch 116 of patch antenna 107 to form antenna stack 110*d*. The profile of antenna stack 110*d* with both NFC coil assembly 1501 and WLC coil assembly 1502 is the same as either antenna stack 110*a* (FIG. 6) or antenna stack 110*b* (FIG. 9).

Figure 17:
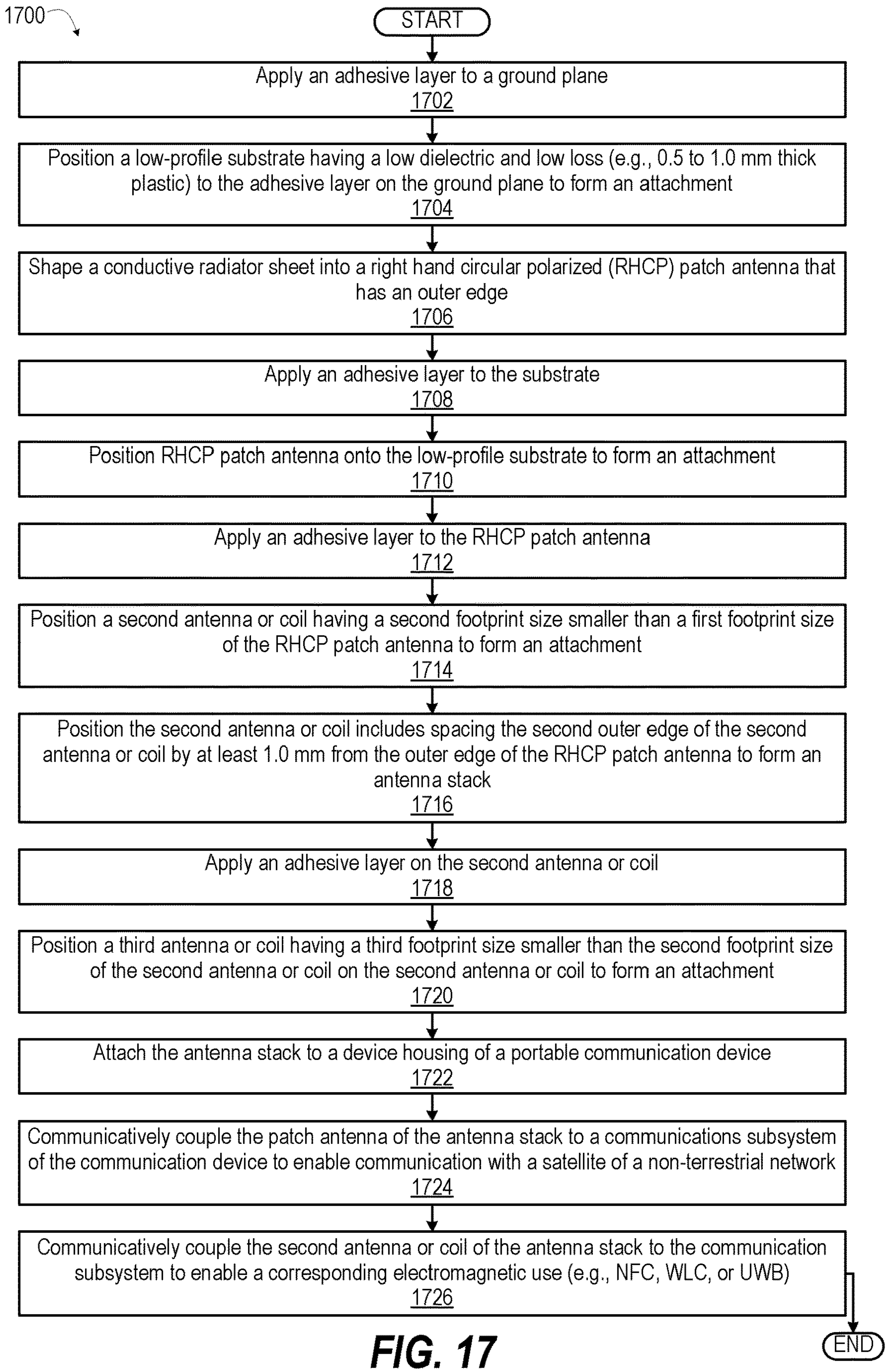
FIG. 17 is a flow diagram presenting a method of making the antenna assembly, which includes assembling a patch antenna configured to communicate with a communication satellite and incorporating the patch antenna into a portable communication device, according to one or more embodiments.

FIG. 17 is a flow diagram of a method of making the antenna assembly of the preceding figures, which method includes assembling a patch antenna configured to communicate with a communication satellite and incorporated into a portable communication device. The description of method 1700 is provided with general reference to the specific components illustrated within the preceding FIGS. 1-7, 9-10, 12-13, and 15-16. Specific components referenced in method 1700 (FIG. 17) may be identical or similar to components of the same name used in describing preceding FIGS. 1-7, 9-10, 12-13, and 15-16. In one or more embodiments, controller 120 (FIG. 1) configures electronic device 101 (FIG. 1) or a similar computing device to control an automatic manufacturing system to provide the described functionality of method 1700 (FIG. 17).

With reference to FIG. 17, method 1700 includes applying an adhesive layer to a ground plane (e.g., thin sheet of conductive metal such as copper) (block 1702). Method 1700 includes positioning a low-profile substrate having a low dielectric constant and low loss to the adhesive layer on the ground plane to form an attachment (block 1704). In an example, the substrate is 0.5 to 1.0 mm thick plastic. Method 1700 includes shaping a conductive radiator sheet into a right hand circular polarized (RHCP) patch antenna that has an outer edge (block 1706). Method 1700 includes applying an adhesive layer to the substrate (block 1708). Method 1700 includes positioning the RHCP patch antenna onto the low-profile substrate to form an attachment (block 1710). Method 1700 includes applying an adhesive layer to the RHCP patch antenna (block 1712). Method 1700 includes positioning a second antenna or coil having a second footprint size smaller than a first footprint size of the RHCP patch antenna to form an attachment (block 1714). Positioning the second antenna or coil includes spacing the second outer edge of the second antenna or coil by at least 1.0 mm from the outer edge of the RHCP patch antenna to form an antenna stack (block 1716). A flex line that carries signal of the second antenna or coil may extend across the outer edge of the RHCP patch antenna. In an example, the second antenna or coil is one of a near field communication (NFC) antenna, a wireless charging (WLC) coil, and an ultra-wideband (UWB) antenna.

In one or more embodiments, method 1700 optionally includes applying an adhesive layer on the second antenna or coil (block 1718). Method 1700 optionally includes positioning a third antenna having a third footprint size smaller than the second footprint size of the second antenna or coil on the second antenna or coil to form an attachment (block 1720). Positioning of the third antenna includes spacing the third outer edge of the third antenna by at least 1.0 mm from the second outer edge of the second antenna or coil to further form the antenna stack. In an example, the third antenna is one of an NFC antenna, a WLC coil, and a UWB antenna, and is a different type from the second antenna or coil. Method 1700 includes attaching the antenna stack to a device housing of a portable communication device (block 1722). Method 1700 includes communicatively coupling the patch antenna of the antenna stack to a communications subsystem of the communication device to enable use of the antenna stack for communication with a satellite of a non-terrestrial network (block 1724). Method 1700 includes communicatively coupling the second antenna or coil of the antenna stack to the communication subsystem to enable a corresponding electromagnetic use (e.g., NFC, WLC, or UWB) (block 1726). Then method 1700 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An antenna assembly comprising:

a patch antenna configured to communicate with a communication satellite and having a first footprint size, the patch antenna comprising: a ground plane; a substrate positioned on the ground plane, the substrate comprising a low dielectric constant and low loss material; and a conductive radiator patch positioned on the substrate; and a second antenna or coil configured for radio frequency (RF) transceiving or electromagnetic energy transfer, having a second footprint size that is smaller than the first footprint size, and positioned on the patch antenna with a second outer edge of the second antenna or coil within an outer edge of the patch antenna.

2. The antenna assembly of claim 1, wherein the patch antenna is configured to transmit and to receive a right hand circularly polarized (RHCP) radio frequency (RF) signal.

3. The antenna assembly of claim 1, wherein the substrate comprises a plastic material in a range of 0.5 to 1 mm thickness.

4. The antenna assembly of claim 1, wherein the second outer edge of the second antenna or coil is spaced inwardly at least 1 mm from a corresponding outer edge of the patch antenna.

5. The antenna assembly of claim 1, wherein the second antenna or coil comprises a near field communication (NFC) antenna.

6. The antenna assembly of claim 5, further comprising a wireless charging (WLC) coil positioned within the NFC antenna.

7. The antenna assembly of claim 1, wherein the second antenna or coil comprises a wireless charging (WLC) coil.

8. The antenna assembly of claim 1, wherein the second antenna or coil comprises an ultra-wideband (UWB) antenna.

9. The antenna assembly of claim 1, further comprising a third antenna configured for RF transceiving, having a third footprint size that is smaller than the second footprint size, and positioned on the second antenna or coil with a third outer edge of the third antenna within a second outer edge of the second antenna or coil.

10. The antenna assembly of claim 9, wherein the second antenna or coil and the third antenna comprise two antennas from among a group comprising: (i) a near field communication (NFC) antenna; (ii) a wireless charging (WLC) coil; and (iii) an ultra-wideband (UWB) antenna.

11. The antenna assembly of claim 1, wherein the patch antenna is configured to transceive within a radio frequency range of 1-2 GHz.

12. A communication device comprising:

a patch antenna configured to communicate with a communication satellite and having a first footprint size, the patch antenna comprising: a ground plane; a substrate positioned on the ground plane and comprising a low dielectric constant and low loss material; and a conductive radiator patch positioned on the substrate;

a second antenna or coil configured for radio frequency (RF) transceiving, having a second footprint size that is smaller than the first footprint size, and positioned on the patch antenna with an outer edge of the second antenna or coil within a corresponding outer edge of the patch antenna; and a communications subsystem communicatively coupled to the patch antenna and configured to at coupled to the second antenna or coil and configured to transceiver with a second communication device via the second antenna or coil.

13. A method comprising:

assembling a patch antenna configured to communicate with a communication satellite and having a first footprint size, the patch antenna comprising: (i) a ground plane; (ii) a substrate comprising a low dielectric constant and low loss material and positioned on the ground plane; and (iii) a conductive radiator patch positioned on the substrate; and attaching a second antenna or coil to the patch antenna, the second antenna or coil configured for radio frequency (RF) transceiving, having a second footprint size that is smaller than the first footprint size, and positioned on the patch antenna with a second outer edge of the second antenna or coil within an outer edge of the patch antenna to form an antenna stack.

14. The method of claim 13, further comprising configuring the conductive radiator patch of the patch antenna to transmit and to receive a right hand circularly polarized (RHCP) radio frequency (RF) signal within a radio frequency range of 1-2 GHZ, and wherein the substrate comprises a plastic material in a range of 0.5 to 1 mm thickness and the second outer edge of the second antenna or coil is spaced inwardly at least 1 mm from a corresponding outer edge of the patch antenna.

15. The method of claim 13, wherein the second antenna or coil comprises a near field communication (NFC) antenna.

16. The method of claim 15, further comprising positioning a wireless charging (WLC) coil within the NFC antenna.

17. The method of claim 13, wherein the second antenna or coil comprises one of a wireless charging (WLC) coil and an ultra-wideband (UWB) antenna.

18. The method of claim 13, further comprising:

positioning a third antenna on the second antenna or coil, the third antenna configured for RF transceiving, having a third footprint size that is smaller than the second footprint size, and positioned on the second antenna or coil with a third outer edge of the third antenna within the second outer edge of the second antenna or coil;

wherein the second antenna or coil and the third antenna comprise two from among a group comprising: (i) a near field communication (NFC) antenna; (ii) a wireless charging (WLC) coil; and (iii) an ultra-wideband (UWB) antenna.

19. The method of claim 13, further comprising:

attaching the antenna stack to a device housing of a portable communication device; and communicatively coupling the antenna stack to a communications subsystem of the communication device to enable communication with a satellite of a non-terrestrial network.

* * * * *